R. W. DEARDORFF.
ELECTRICAL RECEIVING DEVICE.
APPLICATION FILED DEC. 10, 1917.
1,358,138.
Patented Nov. 9, 1920.
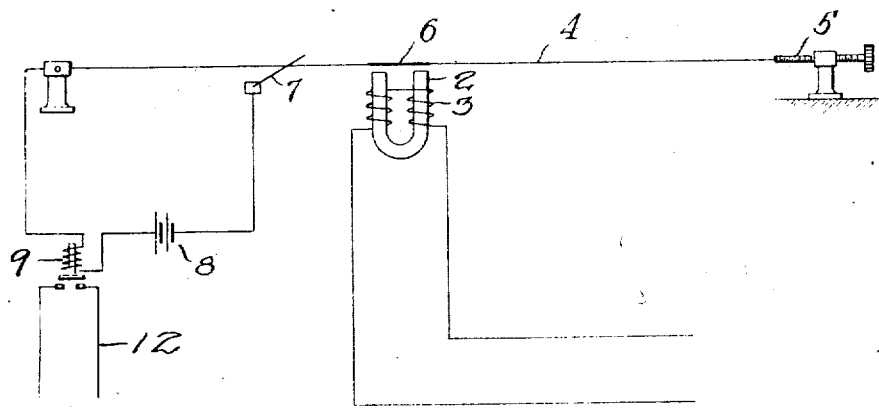
Witness:
J. B. Gardner
INVENTOR
R. W. DEARDORFF
By White Frost.
ATTORNEYS

UNITED STATES PATENT OFFICE.

RALPH W. DEARDORFF, OF SAN FRANCISCO, CALIFORNIA.

ELECTRICAL RECEIVING DEVICE.

1,358,138.  Specification of Letters Patent.  Patented Nov. 9, 1920.

Application filed December 10, 1917. Serial No. 206,518.

*To all whom it may concern:*

Be it known that I, RALPH W. DEARDORFF, a citizen of the United States, and a resident of the city and county of San Francisco and State of California, have invented a certain new and useful Electrical Receiving Device, of which the following is a specification.

The invention relates to a device for selectively receiving electrical oscillations.

An object of the invention is to provide a device for selectively receiving electrical oscillations.

A further object of the invention is to provide a receiving system for electrical oscillations which is simple in construction and effective in operation to selectively receive electrical oscillations of a chosen frequency and cause them to produce a continuous current of the duration of the group of impulses received.

The invention possesses other advantageous features, some of which, with the foregoing, will be set forth at length in the following description, where I shall outline in full, that form of the invention which I have selected for illustration in the drawing accompanying and forming part of the present specification.

The drawing is a diagrammatic representation of the apparatus of my invention. The apparatus may be employed in conjunction with a receiving circuit of any desired arrangement and I do not limit myself to use in connection with any particular receiving circuit.

Arranged in the receiving circuit, in which the radio frequency oscillations are converted in oscillations of tone or audible frequency, is a magnetic field producing device which may be of any desired construction, that shown in the drawing comprising a permanent horse-shoe magnet 2 having a winding 3 on each leg, the windings being connected in the receiving circuit. Electrical impulses or variations in the receiving circuit will produce variations in the field of the magnet. Arranged adjacent the poles of the magnet and lying in the field thereof, is a vibratory element having a natural period of vibration which corresponds to the oscillations produced in the receiving circuit. The vibratory element preferably consists of a metallic reed or wire 4 stretched between two points of support and preferably provided with a take-up screw 5, so that the tension of the wire may be maintained constant or varied, as desired. It is understood that the frequency of vibration of the wire will vary with the variation in tension. Secured to the wire and disposed adjacent the poles of the magnet is an armature 6, provided for the purpose of permitting the varying magnetic field to produce vibration of the wire.

Mounted on a fixed support and bearing against the vibratory element, preferably adjacent its point of greatest vibration amplitude, is a conductor 7. The contact between the conductor and the vibratory element varies with the vibration of the element. The conductor 7 may be of a flexible nature, or of a vibratory nature having a different frequency from the vibratory element, and it is preferred not to make it rigid on account of the damping effect that a rigid conductor would exert on the vibratory element. Connected at one end to the element and at the other end to the conductor, is a local circuit, containing a source of electrical energy, such as the battery 8, and a device which is operated by variations in current strength in the local circuit, such as a relay 9. The relay controls the flow of current in the circuit 12, which may contain any desired electrical apparatus.

The local circuit is normally closed, and the relay shown is of such type that, with the local circuit closed, the circuit 12 is held open. When the wire is set in vibration, the current in the local circuit is reduced beyond the value which is necessary to hold the relay armature up, and under such conditions the armature falls, closing the circuit 12. The group of impulses of tone frequency in the receiving circuit thereby causes the circuit 12 to be closed for a period of time corresponding to the duration of the group of impulses. In this manner, a continuous current of such time duration and either alternating or direct is produced in the circuit 12. The circuit 12 may be an operating circuit, and contain a source of electrical energy and other electrically-operated devices, or it may constitute a further relay circuit.

The frequency of vibration of the vibratory element may be the same or a harmonic of the frequency of the field or the frequency of the field may be a harmonic of the frequency of the vibratory element. Instead of being normally closed, the local circuit may be normally open, and the relay arranged to close the circuit 12 when the wire is set in vibration.

I claim:

1. In an electrical receiving system, a receiving circuit, a vibratory element arranged to be vibrated by variations in current in the receiving circuit, a conductor freely contacting with said element, a local circuit connecting said conductor and the vibratory element, and means in said local circuit operated by variations in the current in the local circuit.

2. In an electrical receiving system, a receiving circuit, a vibratory element having a natural period of vibration arranged to be vibrated by variations in current of similar frequency in the receiving circuit, a flexible conductor contacting with said element at a point of vibration, a local circuit connecting said conductor and said element, and means in said local circuit operated by variations in the current therein.

3. In an electrical receiving system, a vibratory element having a definite period of vibration, means for producing a magnetic field acting on said element, a receiving circuit for electrical impulses connected to said means whereby said impulses produce variations in said field and vibrate said element, and a non-rigid contact device operated by the vibration of said element and connected to a local circuit.

4. In an electrical receiving system, a vibratory element responsive to impulses of definite frequency, a magnetic field acting on said element, means operative by the reception of electrical impulses of said frequency for varying said field at said frequency whereby said element is vibrated, a signal receiving device, and yielding contact means operative by the vibration of and connected to said element for operating said receiving device.

5. In an electrical receiving system, a vibratory element responsive to impulses of definite frequency, a magnetic field acting on said element, means operative by electrical impulses of said frequency for varying said field at said frequency whereby said element is vibrated, a conductor yieldingly contacting with said vibratory element in such manner that vibration of the element varies the resistance of said contact, a local circuit connecting said conductor and element, and means in said local circuit operated by variations in current therein.

6. In an electrical receiving system, a stretched wire having a definite vibration frequency, a receiving circuit for electrical oscillations, means in the receiving circuit for producing a varying magnetic field acting on said wire, the frequency of variation of said field corresponding to the frequency of oscillations in the receiving circuit, a conductor yieldingly and freely bearing against said wire at a point intermediate its ends whereby vibration of the wire causes a variation in resistance between said wire and conductor, a local circuit connecting the wire and said conductor and a source of electrical energy and a varying current operated device in said local circuit.

In testimony whereof I have hereunto set my hand at San Francisco, California, this 26th day of November, 1917.

RALPH W. DEARDORFF.

In presence of—
H. G. PROST.